United States Patent
Huuskonen

(10) Patent No.: US 7,472,135 B2
(45) Date of Patent: Dec. 30, 2008

(54) METHOD AND SYSTEM FOR RECALLING DETAILS REGARDING PAST EVENTS

(75) Inventor: Pertti Huuskonen, Tampere (FI)

(73) Assignee: Nokia Corporation, Espoo (FI)

( * ) Notice: Subject to any disclaimer, the term of this patent is extended or adjusted under 35 U.S.C. 154(b) by 241 days.

(21) Appl. No.: 10/273,297

(22) Filed: Oct. 18, 2002

(65) Prior Publication Data
US 2004/0078372 A1  Apr. 22, 2004

(51) Int. Cl.
*G06F 7/00* (2006.01)
*G06F 12/00* (2006.01)
*G06F 15/16* (2006.01)

(52) U.S. Cl. .................. 707/104.1; 707/3; 707/100; 707/200; 709/203

(58) Field of Classification Search .............. 707/1–10, 707/100–102, 200–201, 104.1; 709/201, 709/217–224, 203; 379/411, 210.01; 455/461, 455/433; 717/137, 141; 705/1, 9; D11/125, D11/127, 131, 134, 157, 158; D21/576–661; 428/13–16, 39, 542.2, 542.4
See application file for complete search history.

(56) References Cited

U.S. PATENT DOCUMENTS

| | | | | |
|---|---|---|---|---|
| 4,907,170 A * | 3/1990 | Bhattacharya | .............. | 706/14 |
| 5,276,775 A * | 1/1994 | Meng | .................... | 706/51 |
| 5,465,319 A * | 11/1995 | Ahamed | ................. | 706/10 |
| 5,539,665 A | 7/1996 | Lamming et al. | ........ | 364/514 R |
| 5,671,338 A * | 9/1997 | Araki et al. | ................... | 706/46 |
| 6,108,640 A * | 8/2000 | Slotznick | .................... | 705/26 |
| 6,112,206 A * | 8/2000 | Morris et al. | ................ | 707/10 |
| 6,181,935 B1 * | 1/2001 | Gossman et al. | ............ | 455/433 |
| 6,341,279 B1 * | 1/2002 | Nye | ............... | 707/3 |
| 6,456,234 B1 * | 9/2002 | Johnson | ............... | 342/357.09 |
| 6,516,316 B1 * | 2/2003 | Ramasubramani et al. | ..... | 707/9 |
| 6,571,215 B1 * | 5/2003 | Mahapatro | .................... | 705/8 |
| 6,600,902 B1 | 7/2003 | Bell | ........................ | 455/41 |
| 6,604,094 B1 * | 8/2003 | Harris | ....................... | 706/48 |
| 6,654,768 B2 | 11/2003 | Celik | ...................... | 707/104.1 |
| 6,658,264 B1 | 12/2003 | Irvin | ........................ | 455/552.1 |
| 6,675,356 B1 * | 1/2004 | Adler et al. | ................ | 715/530 |
| 6,697,352 B1 * | 2/2004 | Ludwig et al. | .............. | 370/349 |

(Continued)

FOREIGN PATENT DOCUMENTS

EP  0637807 A2  2/1995

(Continued)

OTHER PUBLICATIONS

International Search Report mailed on Feb. 24, 2004, in corresponding International Application No. PCT/IB03/04546.

*Primary Examiner*—Miranda Le
(74) *Attorney, Agent, or Firm*—Morgan & Finnegan, LLP

(57) ABSTRACT

Techniques for recalling details regarding past events include identifying information from encountered remote devices, and storing the received identifying information in a proximity log database. An entry (e.g., a phonebook or calendar entry) stored by a personal information management application is accessed, and a query is generated from parameters provided by a personal information management application. Based on this query, the method searches the proximity log database; and receives a result from the proximity log database as a response to the query. The result identifies a past remote device encounter. Heuristics may be employed to infer data from the result.

25 Claims, 6 Drawing Sheets

U.S. PATENT DOCUMENTS

| | | | |
|---|---|---|---|
| 6,697,948 B1* | 2/2004 | Rabin et al. | 726/30 |
| 6,711,253 B1* | 3/2004 | Prabhaker | 379/265.01 |
| 6,751,626 B2* | 6/2004 | Brown et al. | 707/101 |
| 6,760,728 B1* | 7/2004 | Osborn | 707/10 |
| 6,795,710 B1* | 9/2004 | Creemer | 455/456.3 |
| 6,842,107 B2* | 1/2005 | Takemura et al. | 340/286.02 |
| 6,982,962 B1* | 1/2006 | Lunsford et al. | 370/278 |
| 6,996,566 B1* | 2/2006 | George et al. | 707/100 |
| 6,999,975 B1* | 2/2006 | Garrean | 707/200 |
| 7,003,327 B1* | 2/2006 | Payne et al. | 455/566 |
| 7,016,325 B2* | 3/2006 | Beasley et al. | 370/331 |
| 7,039,639 B2* | 5/2006 | Brezin et al. | 707/10 |
| 7,058,710 B2* | 6/2006 | McCall et al. | 709/224 |
| 7,062,528 B2* | 6/2006 | Deguchi | 709/203 |
| 7,107,312 B2* | 9/2006 | Hackbarth et al. | 709/204 |
| 7,161,923 B2* | 1/2007 | Young | 370/338 |
| 2001/0019338 A1* | 9/2001 | Roth | 345/811 |
| 2001/0022558 A1* | 9/2001 | Karr et al. | 342/450 |
| 2002/0010745 A1* | 1/2002 | Schneider | 709/206 |
| 2002/0078070 A1* | 6/2002 | Eshelman et al. | 707/200 |
| 2002/0167965 A1* | 11/2002 | Beasley et al. | 370/465 |
| 2002/0169769 A1* | 11/2002 | Jackson | 707/4 |
| 2002/0178161 A1* | 11/2002 | Brezin et al. | 707/10 |
| 2003/0014292 A1* | 1/2003 | Strubbe et al. | 705/8 |
| 2003/0014395 A1* | 1/2003 | Ruvolo et al. | 707/3 |
| 2003/0041042 A1* | 2/2003 | Cohen et al. | 706/45 |
| 2003/0055759 A1* | 3/2003 | Conkwright et al. | 705/35 |
| 2003/0061132 A1* | 3/2003 | Yu et al. | 705/30 |
| 2003/0107650 A1* | 6/2003 | Colmenarez et al. | 348/150 |
| 2003/0112944 A1* | 6/2003 | Brown et al. | 379/201.01 |
| 2003/0118087 A1* | 6/2003 | Goldthwaite et al. | 375/219 |
| 2003/0126100 A1* | 7/2003 | Chithambaram | 706/8 |
| 2003/0163465 A1* | 8/2003 | Morrill et al. | |
| 2004/0002958 A1* | 1/2004 | Seshadri et al. | 707/3 |
| 2004/0034638 A1* | 2/2004 | Brown et al. | 707/10 |
| 2007/0032225 A1* | 2/2007 | Konicek et al. | 455/417 |

FOREIGN PATENT DOCUMENTS

| | | |
|---|---|---|
| EP | 1213677 A | 6/2002 |
| WO | WO 02/43328 A2 | 5/2002 |

* cited by examiner

| Timestamp 402 | Device ID 404 | Device name 406 | Device type 408 | Owner 410 | Event 412 | Suppl. Data 414 |
|---|---|---|---|---|---|---|
| 19-Jan-2004 15:47:56.92 836 | 0x6876 432f786 e75 | Door C5 in Parliament House | DOOR | Parliament House (housing@parl.org) | OPEN DOOR | |
| 19-Jan-2004 15:48:12.56 983 | 0x32ef5 8739f92 9a9 | Suzie's Watch | WATCH | Susan Simpson (zippy@acme.org) | INIT BTH SESSION | |
| 19-Jan-2004 15:48:13.82 764 | 0x32ef5 8739f92 9a9 | Suzie's Watch | WATCH | Susan Simpson (zippy@acme.org) | VCARD EXCHANGE | <VCARD DATA> |
| 19-Jan-2004 15:49:04.14 3205 | 172.23.45.230 | Room temperature | THERMOMETER | Parliament House (housing@parl.org) | HTTP GET | Temp: 21.7C |
| 19-Jan-2004 16:09:34.72 6345 | 34.124.96.254 | Bill's Communicator | PHONE | Bill Board | VCARD EXCHANGE | <VCARD DATA> |

420a → (row 1)
420b → (row 2)
420c → (row 3)
420d → (row 4)
420e → (row 5)

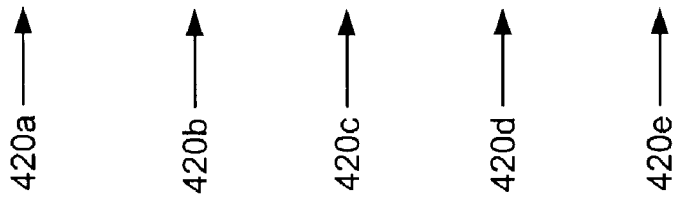

FIG. 4

METHOD AND SYSTEM FOR RECALLING DETAILS REGARDING PAST EVENTS

FIELD OF THE INVENTION

The present invention relates to wireless communications. More particularly, the present invention relates to using a wireless communications device to recall details regarding past events.

BACKGROUND OF THE INVENTION

People often struggle with finding information related to their past. For instance, people often encounter difficulties when trying to recall particular details of previous experiences. Listed below are five questions exemplifying details that people often have trouble remembering.
1. Where and when did I last meet Susan?
2. What was the name of that Nepalese restaurant in Helsinki I visited last August?
3. Where was I last Friday between 6 and 8 PM?
4. What was the web address of that camera shop in Hong Kong?
5. How often have I been fishing this summer?

Numerous techniques and devices are often employed to assist in remembering such details. For example, calendars, diaries, logbooks, pictures, and maps are resources that can be used to locate such information from the past. In addition, other people's memories can be used to help refresh one's recognition of a past event. Unfortunately, these techniques are often ineffective because they tend to rely on the unreliable memories of other people, and on an individual's diligence in manually recording various details of his experiences.

Automated techniques also exist to help recall details from past experiences. For example, in the context of office automation, tools and personal information management applications such as calendar databases, notes, contact cards, and other files, can be searched to extract information about past events. However, these techniques make little or no use of information that can be transmitted between devices over wireless links and stored for future access.

Various wireless communications technologies allow two or more devices to automatically exchange information when they arrive in each other's proximity. Such automatic exchange of information is sometimes referred to as "ad hoc networking." Bluetooth is a wireless communications standard that provides for such ad hoc networking.

Bluetooth defines a short-range radio network, originally intended as a cable replacement. It can be used to create ad hoc networks of up to eight devices, where one device is referred to as a master device. The other devices are referred to as slave devices. The slave devices can communicate with the master device and with each other via the master device. The Bluetooth Special Interest Group, *Specification Of The Bluetooth System*, Volumes 1 and 2, Core and Profiles: Version 1.1, Feb. 22, 2001, describes the principles of Bluetooth device operation and communication protocols. This document is incorporated herein by reference in its entirety. The devices operate in the 2.4 GHz radio band reserved for general use by Industrial, Scientific, and Medical (ISM) applications. Bluetooth devices are designed to find other Bluetooth devices within their communications range and to discover what services they offer.

Encounters between wireless communications devices are often associated with events that a person may wish to recall at a later time. Accordingly, there is a need for effective ways to record and retrieve information related to encounters between wireless communications devices.

SUMMARY OF THE INVENTION

The present invention provides techniques for recalling details related to past events. Accordingly, a wireless communications device of the present invention includes an encounter management module that receives identifying information from encountered remote devices, and a proximity log database that stores the identifying information received by the encounter management module. The wireless communications device also includes a personal information management application, such as a phonebook application or a calendar application, and a recall module. The personal information management application provides parameters for a query related to a past event. The recall module searches the proximity log database according to the query. In response to the query, the recall module receives a result from the proximity log database that identifies a past remote device encounter.

The encounter management module may include a heuristics engine that infers information from the result. This heuristics engine may infer such information by searching records in the proximity log database that correspond to events occurring within a predetermined time interval of the past remote device encounter identified by the result. The heuristics engine may also do this by interacting with a calendar application configured to determine a topical context for the past remote device encounter identified by the result. Such a topical context may be identified by indicating a topic of an appointment scheduled within a predetermined time interval of the past remote device encounter identified by the result.

The identifying information received by the encounter management module may include a unique remote device identifier received through a link level connection (e.g., a Bluetooth connection) and additional information received through a higher layer protocol session (e.g., an application layer session). An example of such additional information includes a vCard.

To efficiently search the proximity log database, the encounter management module may search information related to encounters involving higher layer protocol sessions before searching information related to encounters involving only link level connections.

A method of the present invention receives identifying information from encountered remote devices, and stores the received identifying information in a proximity log database. The method also accesses an entry (e.g., a phonebook or calendar entry) stored by a personal information management application, and generates a query from the personal information management application that is related to a past event. Based on this query, the method searches the proximity log database according to the query; and receives a result from the proximity log database as a response to the query. The result identifies a past remote device encounter.

The method may also infer information from the result through the application of one or more heuristics. For example, the method may search records in the proximity log database that correspond to events occurring within a predetermined time interval of the past remote device encounter identified by the result. Also, the method may determine a topical context of the past remote device encounter by indicating a topic of an appointment within a predetermined time interval of the past remote device encounter identified by the result.

The receiving step includes receiving a unique remote device identifier through a link level connection (e.g., a Bluetooth connection) and additional information through a higher layer protocol session (e.g., an application-level session). Such additional information may include a vCard.

The method may search the proximity log database for information related to encounters involving higher layer protocol sessions before searching information related to encounters involving only link level connections.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 4 is a diagram of an proximity log database;

DETAILED DESCRIPTION OF THE PREFERRED EMBODIMENTS

I. Operational Scenario

Figure 1:
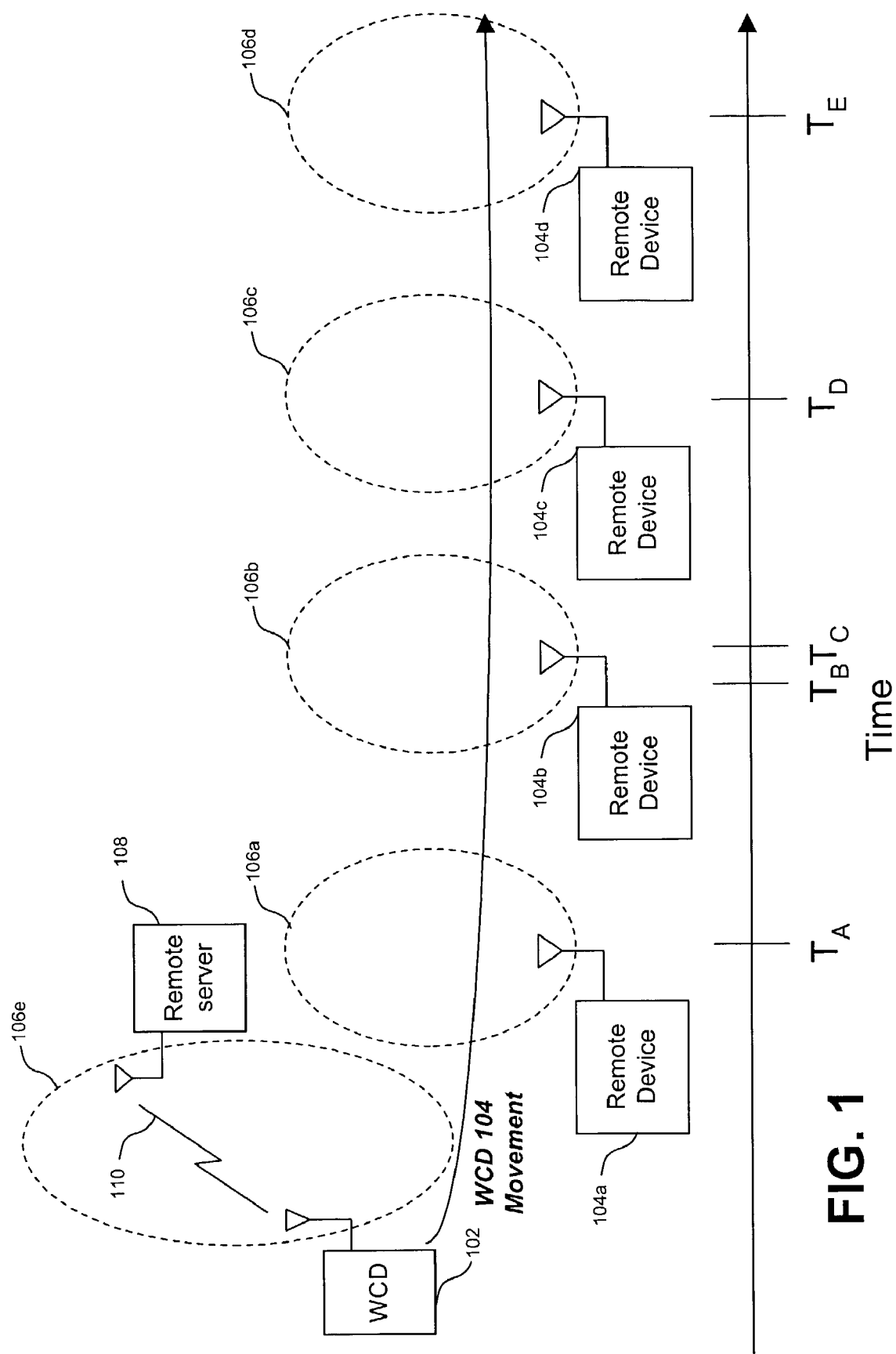
FIG. 1 is a block diagram of an operational scenario where a portable wireless communications device experiences a series of encounters with remote devices.

Before describing the invention in detail, it is helpful to describe an environment in which the invention may be used. Accordingly, FIG. 1 is a block diagram of an operational scenario where a portable wireless communications device (WCD) 102 experiences a series of encounters with remote devices 104. These encounters are shown as occurring in chronological order at times $T_A$, $T_B$, $T_C$, and $T_D$. With each of these encounters, WCD 102 participates in a proximity network that includes WCD 102 and the corresponding remote device 104.

These proximity networks may be based on various wireless communications technologies. For example, these networks may employ Bluetooth technology, wireless Internet Protocol (IP) technology, optical communications technology, as well as other suitable communications technologies.

FIG. 1 shows that each of WCD 102 and remote devices 104 has a respective coverage area 106 that determines the ranges at which the devices 102 and 104 may engage in communications. As shown in FIG. 1, coverage areas 106a-d correspond to remote devices 104a-d, respectively. Coverage area 106e corresponds to WCD 102. An exemplary coverage area is between 10 and 15 meters in diameter. However, other coverage area sizes may be used. An encounter may occur when two devices have overlapping coverage areas.

During each of the encounters shown in FIG. 1, WCD 102 establishes a communications link with the corresponding remote device 104. Once this link is established, WCD 102 receives identifying information from the remote device 104. This identifying information includes a unique identifier of the remote device 104. In encounters employing Bluetooth, this unique identifier may be the remote device's BD_ADDR. For non-Bluetooth encounters, other unique identifiers may be used, such as an IP addresses.

In addition to receiving a unique identifier, WCD 102 may also receive the name of the remote device 104. This name may be set by the owner or user of the remote device 104. Examples of remote device names include "Jim's phone," and "Mary's PDA." Moreover, during each of these encounters, WCD 102 may receive information from the remote device 104, such as the remote device type, the remote device owner, a description of event(s) associated with the encounter, and owner contact information. Owner contact information may be in various forms, one form being a vCard.

vCard is a standard that automates the exchange of personal information typically found on a traditional business card. vCard is used in applications such as Internet mail, voice mail, Web browsers, telephony applications, call centers, video conferencing, Personal Information Managers (PIMs), Personal Data Assistants (PDAs), pagers, fax, office equipment, and smart cards. vCard information may go beyond simple text, and include elements like pictures, company logos, Web addresses, and other information.

In Bluetooth, an exchange of BD_ADDRs occurs during the establishment of a connection between two devices. However, in Bluetooth, the exchange of additional information, as described above, may need to be performed by higher layer (e.g., application-level) protocol sessions. Accordingly, the exchange of such additional information may involve establishing communications between application-level processes on WCD 102 and the corresponding remote device 104.

The encounters of FIG. 1 provide examples of information exchanged according to embodiments of the present invention. FIG. 1 shows that WCD 102 first encounters remote device 104a at time $T_A$. Device 104a is a Bluetooth device associated with a door (e.g., Door C5 in Parliament House). During this encounter, a Bluetooth link is established between WCD 102 and remote device 104a. Through the establishment of this link, WCD 102 receives the BD_ADDR of remote device 104a. Once this link is established, WCD 102 receives additional information from remote device 104a, such as its name ("Door C5 in Parliament House"), its type (door), the owner of remote device 104a (Parliament House), and contact information for the owner in the form of an e-mail address (housing@parl.org). In addition, WCD 102 also receives a description of an event associated with this encounter (open door).

Next, WCD 102 encounters remote device 104b at time $T_B$. Device 104b is a watch worn by Suzie. A Bluetooth link is established between these devices during this encounter, and WCD 102 receives the BD_ADDR of remote device 104b. During this encounter, WCD 102 also receives the name of remote device 104b ("Suzie's Watch"), its type (watch), the owner of remote device 104b (Susan Simpson), and contact information for the owner in the form of an e-mail address (zippy@acme.org).

Subsequently, at time $T_C$, WCD 102 once again encounters remote device 104b. As in the earlier encounter with remote device 104b, a Bluetooth link is established during this encounter, and WCD 102 receives the BD_ADDR of remote device 104b. During this encounter, WCD 102 may or may not receive the additional information received during the encounter at time $T_B$. However, during this encounter, WCD 102 receives information from remote device 104b in the form of a vCard.

Following the encounter with remote device 104b, WCD 102 encounters device 104c at time $T_D$. Device 104c is a thermometer at the Parliament House. This encounter includes an Internet Protocol (IP) link being established between WCD 102 and remote device 104c. During this encounter, WCD 102 receives the IP address of remote device 104c, the name of remote device 104c ("room temperature"), its type (thermometer), the owner of remote device 104c (Parliament House), and contact information for the owner in the form of an e-mail address (housing@parl.org). Also during this encounter, WCD 102 receives a temperature reading from remote device 104c. The transmission of this temperature reading is transmitted in response to WCD 102 sending an HTTP get request to remote device 104c.

After the encounter with device 104c, WCD 102 encounters remote device 104d at time $T_E$. Device 104d is a Bluetooth device. Accordingly, a Bluetooth link is established where WCD 102 receives the BD_ADDR of remote device 104d. During this encounter, WCD 102 also receives the name of remote device 104d ("Bill's Communicator"), its type (phone), the owner of remote device 104b (Bill Board), and contact information for the owner in the form of a vCard.

The scenario of FIG. 1 demonstrates that WCD 102 encounters devices that are associated with people, and devices that are associated with objects (such as a door and a thermometer). Devices that are associated with people are referred to herein as personal devices, while devices that are associated with objects are referred to herein as impersonal devices.

With reference to FIG. 1, remote devices 104a and 104c are both impersonal devices because they are associated with a door and a thermometer. In contrast, remote devices 104b and 104d are both personal devices because they are associated with people (i.e., Suzie and Bill).

WCD 102 stores information from each of these encounters. For example, WCD 102 stores the time of each encounter, information regarding the encountered remote device 104, and information regarding the owner of the encountered remote device 104. In addition, WCD 102 may store whether each encountered remote device 104 is a personal device or an impersonal device. This allows for the efficient retrieval of stored information regarding past encounters.

Alternatively, such information may be stored in a remote server 108. Remote server 108 communicates (either directly or through one or more wired networks such as the Internet) with WCD 102 across a wireless link 110. This wireless link may operate according to various wireless communications techniques, such as cellular telephony, Bluetooth, and other suitable techniques. Accordingly, remote server 108 may be implemented as one or more computer systems that each include a processor, and memory. Remote server 108 may also include communications components that enable it to communicate with WCD 102 directly across wireless link 10. The storage of such information by remote server 108 advantageously reduces information storage requirements for WCD 102.

Such information may be sent to remote server 108 periodically or after a certain threshold of remote device encounters in WCD 102 is exceeded. Such approaches are directed to efficiently utilizing communications resources. This is especially important in environments containing large numbers of communications devices.

Encounters according to various communications technologies are within the scope of the present invention. For instance, the scenario of FIG. 1 involves encounters employing both Bluetooth and IP technologies. Other technologies may also be employed.

II. Exemplary WCD

Figure 2:
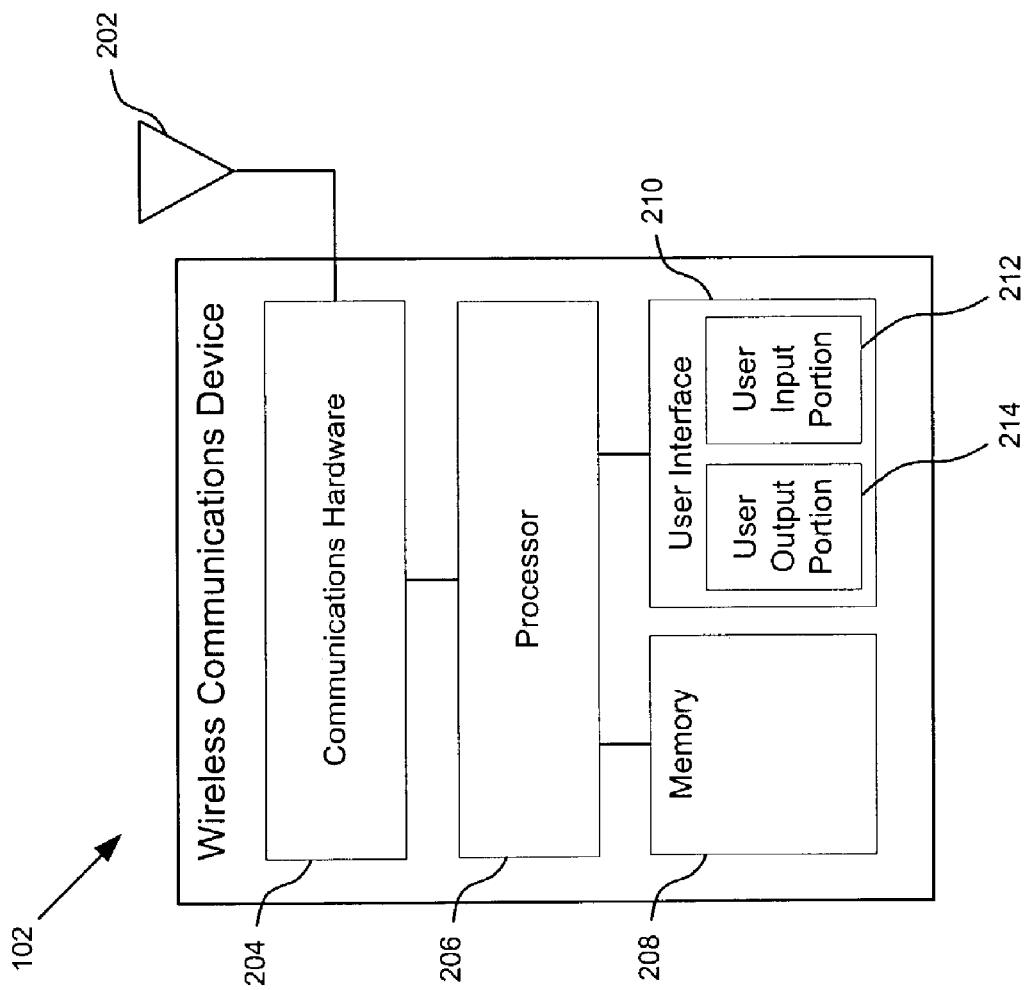
FIG. 2 is a block diagram showing an exemplary implementation of a wireless communications device.

FIG. 2 is a block diagram showing an exemplary implementation of WCD 102. This diagram shows that WCD 102 includes several components. For instance, WCD 102 includes a communications hardware portion 204 that is coupled to an antenna 202. Communications hardware portion 204 includes electronics, such as a transceiver. These electronics allow WCD 102 to engage in bidirectional RF communications with network entities, such as remote devices 104, base stations and Bluetooth access points (e.g., Bluetooth access points). In certain WCD 102 implementations, communications hardware portion 204 provides for multiple communications circuits. For example, Bluetooth phone implementations provide for separate Bluetooth transceiver and cellular transceiver circuits.

As shown in FIG. 2, a processor 206 is coupled to communications hardware portion 204. Processor 206 controls all of the functions of terminal device 106. Processor 206 may be implemented with one or more microprocessors that are each capable of executing software instructions stored in a memory 208.

A user interface 210 is coupled to processor 206. User interface 210 facilitates the exchange of information with a user. FIG. 2 shows that user interface 210 includes a user input portion 212 and a user output portion 214. User input portion 212 may include one or more devices that allow a user to input information. Examples of such devices include keypads, touch screens, and microphones. User output portion 214 allows a user to receive information from WCD 102. Thus, user output portion 214 may include various devices, such as a display, and one or more audio speakers. Exemplary displays include liquid crystal displays (LCDs), and video displays.

Memory 208 includes random access memory (RAM), and stores information in the form of data (e.g., in databases) and software components. These software components include instructions that can be executed by processor 206. Various types of software components may be stored in memory 208. For instance, memory 208 may store software components that control the operations of communications hardware portion 204, and software components that control the exchange of information through user interface 210. In addition, memory 208 may store software components that are associated with user applications.

These user applications allow WCD 102 to engage in communications sessions involving services, such as telephony, retrieval of content from remote servers, and ad hoc networking. Furthermore, these user applications allow users of WCD 102 to store, manage, and retrieve information such as phonebook entries, calendar applications, and histories of remote device encounters.

User applications that allow WCD 102 to receive content from remote servers operate according to protocols, such as the Wireless Application Protocol (WAP). When engaging in WAP communications with a remote server, WCD 102 functions as a WAP client. To provide this functionality, memory 208 includes WAP client software, such as WAP Client Version 2.0. WAP Client Version 2.0 is a commercially available software product provided by Nokia Corporation of Finland. WAP Client Version 2.0 contains components, such as a Wireless Markup Language (WML) Browser, a WMLScript engine, a Push Subsystem, and a Wireless Protocol Stack.

Application software components stored in memory 208 of WCD 102 interact with the WAP client software to provide a variety of communications services. Examples of such communications services include the reception of Internet-based content, such as headline news, exchange rates, sports results, stock quotes, weather forecasts, multilingual phrase dictionaries, personal online calendars, and online travel and banking services.

WAP-enabled WCD 102 may access small files called decks which each include smaller pages called cards. Cards are small enough to fit into a small display area that is referred to herein as a microbrowser. The small size of the microbrowser and the small file sizes are suitable for accommodating low memory devices and low-bandwidth communications constraints imposed by wireless links.

Cards are written in the Wireless Markup Language (WML), which is specifically devise for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting language, WMLScript places minimal demands on memory 208 and processor 206.

The illustrated elements of WCD 102 may be coupled according to various techniques. One such technique involves coupling communications hardware 204, processor 206, memory 208, and user interface 210 through one or more bus interfaces. In addition, each of these components is coupled to a power source, such as a removable and rechargeable battery pack (not shown).

III. Terminal Device Software Architecture

Figure 3:
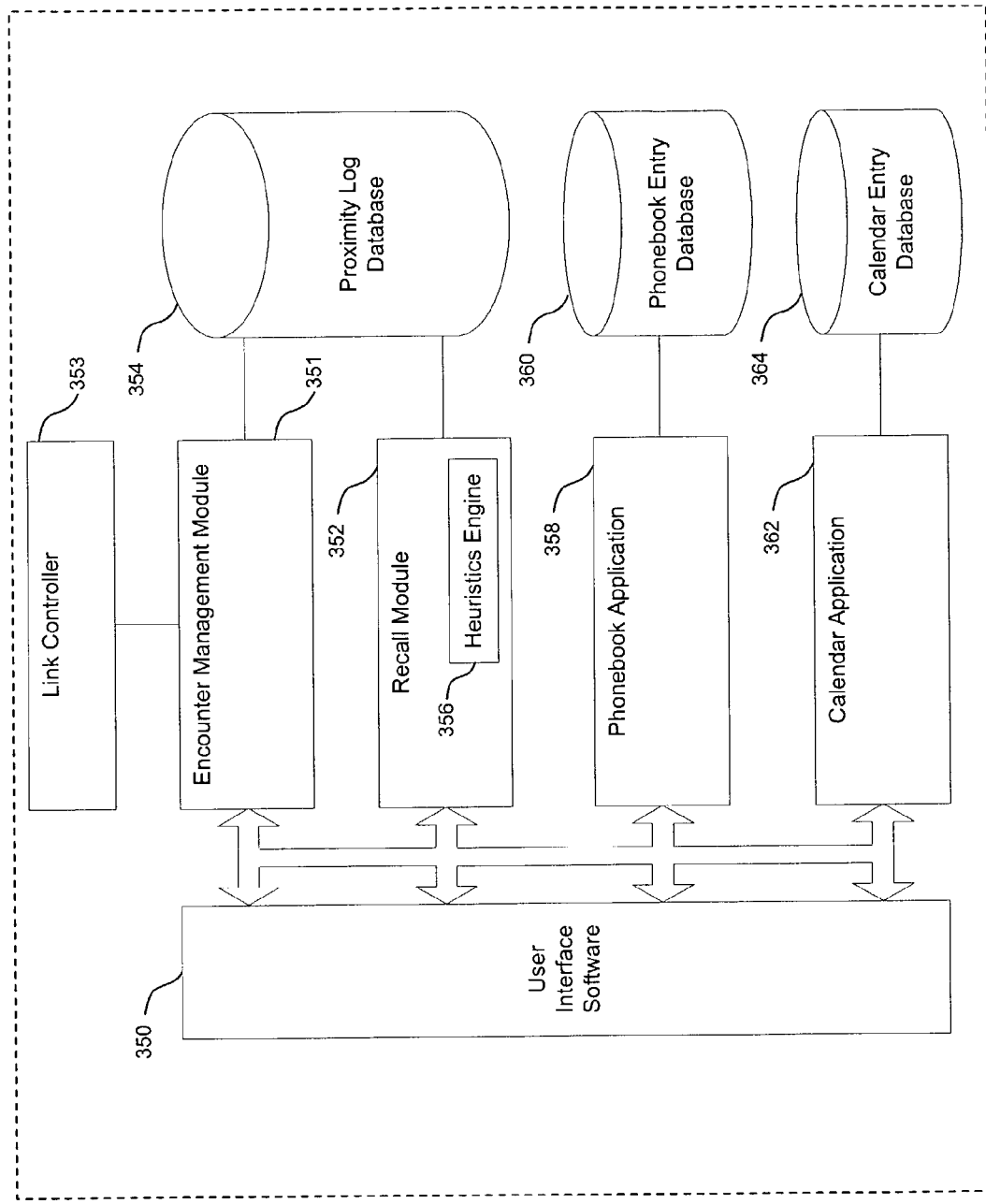
FIG. 3 is a block diagram showing an architecture of databases and software components employed in a wireless communications device.

FIG. 3 is a block diagram showing a software architecture of databases and software components that may employed in WCD 102. When employing the WCD 102 implementation of FIG. 2, these databases and software components may be stored in memory 208. This architecture provides WCD 102 with the capability to collect and store information pertaining to encounters with remote devices. In addition, this architecture provides a user with the ability to search this stored information so that the user may recall details of past events.

The architecture of FIG. 3 includes various software modules. As shown in FIG. 3, these modules include a user interface software module 350, an encounter management module 351, a recall module 352, a link controller 353, a phonebook application module 358, and a calendar application module 362.

The architecture of FIG. 3 also includes various databases. In particular, a proximity log database 354 is coupled to encounter management module 351, a phonebook entry database 360 is coupled to phonebook application 358, and a calendar entry database 364 is coupled to calendar application 362. These databases may be implemented in various ways. For example, each of these databases may be a relational database, an object oriented database, or other suitable database implementations.

Link controller 353 handles link level control and functionality for communications with remote devices. For example, in Bluetooth implementations, link controller 353 handles link operations, such as device discovery, and paging. In handling these operations, link controller 353 interacts with hardware portions of WCD 102, such as communications hardware portion 204 in the WCD 102 embodiment of FIG. 2.

User interface software module 350 allows a user to interact with various software applications and/or modules to operate terminal device 102 according to the techniques of the present invention. In particular, user interface software 350 provides interfaces to modules 351, 352, 358, and 362. These interfaces provide for the exchange of information, such as user-initiated commands, and information to be outputted by user interface 210. User interface software 350 also includes components, such as device drivers, that control the operation of user interface 210 components, such as displays, speakers, microphones, keypads, and/or touch screen displays.

The architecture of FIG. 3 shows phonebook application 358, and calendar application 362. These applications are each personal information management applications, because they store personal information involving, for example, scheduling, and personal contacts. Although FIG. 3 shows only these applications, other personal information management applications may be employed by the present invention during remote device encounters, and recall operations.

Phonebook application module 358 is coupled to phonebook entry database 360. Together, phonebook application 358 and phonebook entry database 360 operate to provide a user with the ability to store and retrieve contact information regarding people and devices. In addition, phonebook application 358 may generate queries that are related to past events.

Calendar application module 362 is coupled to calendar entry database 364. Calendar application 362 and calendar entry database 364 operate together so that a user may store and retrieve calendar items, such as scheduled appointments, as well as significant dates and times. Like phonebook application 358, calendar application 362 may also generate queries that are related to past events.

Proximity log database 354 stores entries that each identify a prior communications session. Examples of such entries are described below with reference to FIG. 4. Modules 351 and 352 each interact with proximity log database 354, but in different ways. More particularly, encounter management module 351 involves the creation of entries in proximity log database 354, while recall module 352 involves the access of information from proximity log database 354.

Encounter management module 351 directs the reception of information from link controller 353, and optionally establishes higher layer (e.g., application-level) protocol sessions with remote devices. In particular, encounter management module 351 receives unique remote device identifiers. Encounter management module 351 may receive these unique identifiers, such as BD_ADDRs, from link controller 353. However, as an alternative, encounter management module 351 may directly collect such unique identifiers through higher level protocol sessions established with remote devices.

As well as receiving unique device identifiers, WCD 102 may also receive additional information during encounters with remote devices. As described above with reference to FIG. 1, examples of such additional information include names of remote devices, names and contact information of remote device owners, as well as information describing events associated with remote device encounters. Such additional information may be received through link controller 353. Alternatively, encounter management module 351 may directly collect such additional information through higher level (e.g., application layer) protocol sessions that it establishes during remote device encounters.

Recall module 352 provides a user of WCD 102 with the capability to formulate queries and submit them to proximity log database 354. In response to such queries, recall module 352 receives results from proximity log database 354. These results identify records stored in proximity log database 354 that satisfy parameters of the corresponding query.

FIG. 3 shows that recall module 352 includes a heuristics engine 356. Heuristics engine 356 infers data from the query results returned by proximity log database 354. These inferences are made by identifying patterns, relationships, and/or interdependencies between entries in proximity log database 354. In addition, these inferences may be made by identifying patterns, relationships, and/or interdependencies with data that is not directly contained in proximity log database 354.

Recall module 352 provides for user interaction involving the entry of queries and the output of query results. Recall module 352 also provides for the output of results refined by inferences made by heuristics engine 356.

As described above, the architecture of FIG. 3 may be implemented using software running (that is, executing) in an environment similar to that described above with respect to FIG. 2. This software (also referred to herein as a computer program product) is stored in memory 208 and executed by processor 206. When executing, the software enables WCD 102 to perform the features of the present invention, as described herein.

However, the present invention may be implemented as control logic in software, firmware, hardware or any combination thereof. For example, in embodiments, the invention is implemented primarily in firmware and/or hardware using, for example, hardware components such as application specific integrated circuits (ASICs). Implementation of a hardware state machine to perform the functions described herein will be apparent to persons skilled in the relevant art(s).

IV. Example Proximity Log Database

FIG. 4 is a diagram of an proximity log database 354. This diagram illustrates the contents of proximity log database 354 in a tabular format. Proximity log database 354 includes several entries (also referred to herein as records) 420a-e that each contain information corresponding to a particular remote device encounter. With reference to the scenario of FIG. 1, records 420a-e correspond to the remote device encounters at times $T_A$, $T_B$, $T_C$, $T_D$, and $T_E$, respectively.

FIG. 4 shows each record 420 as a row having multiple columns. Each of these columns corresponds to a particular field within the record. Accordingly, FIG. 4 shows that each record 420 includes a timestamp field 402, a device ID field 404, a device name field 406, a device type field 408, an owner field 410, an event field 412, and a supplementary data field 414

For each record 420, timestamp field 402 indicates the time that the corresponding encounter occurred. This time may be derived from an internal clock of WCD 102. As described above with reference to FIG. 1, each remote device has a unique identifier. For example, a Bluetooth device has a BD_ADDR. Similarly, a device that communicates according to the Internet Protocol (IP) has an IP address. FIG. 4 shows that each record 420 includes a device ID field 404 that stores the unique identifier of an encountered remote device. For example, the device ID fields of records 420a-420c each include a BD_ADDR. In contrast, the device ID fields of records 420d and 420e each include an IP address.

Device name field 406 stores a descriptive name of the encountered remote device indicated by device ID field 404. This name may be assigned by the remote device's owner. Accordingly, this field may include text that describes, for example, the location, type, and/or owner of the remote device.

Device type field 408 stores the type of device that was encountered. Examples of device types include, phones, and PDAs. Such information indicates whether the encountered remote device is a personal device or a device associated with an object. For example, the fields 408 corresponding to records 420b, 420c, and 420e summarize encounters with watches and a phone. Owner field 410 stores information identifying the owner of the encountered remote device. Additionally, this field may include contact information for the owner, such as an e-mail address.

In Bluetooth implementations, an encountered device's type may be recognized by its Class of Device (CoD). CoD is a field contained in a inquiry response packet that is exchanged during a Bluetooth inquiry process that indicates the device's type (e.g., phone, PDA, workstation, Network Access Point, etc). Alternatively, device type information may also be received through service discovery protocol (SDP) information received after Bluetooth inquiry and paging operations are performed. Bluetooth inquiry and SDP processes are described below with reference to FIG. 6.

Event field 412 describes events that occurred during the encounter with the remote device. Such events may be the establishment of a particular communications session, exchange of information, retrieval of information through a request, and actions involving tangible objects. Examples of event description stored in event fields 412 are shown in FIG. 4 as "open door," "initiate Bluetooth session," "vCard exchange," and "HTTP get."

Supplementary data field 414 includes other data that WCD 102 received during the remote device encounter. This supplementary data may be associated with an event described in event field 412. For example, if the event described in event field 412 is a vCard exchange, supplementary data field 414 may include the exchanged vCard. Similarly, if the event described in event field 412 is an HTTP get request, supplementary data field 414 may include a response to the HTTP get request. An example of such a response is shown in record 420d as a temperature reading.

Records in proximity log database 354 may include other fields. For example, a remote device mobility field may be employed that indicates whether an encountered remote device is fixed or stationary.

V. Operation

Figure 5:
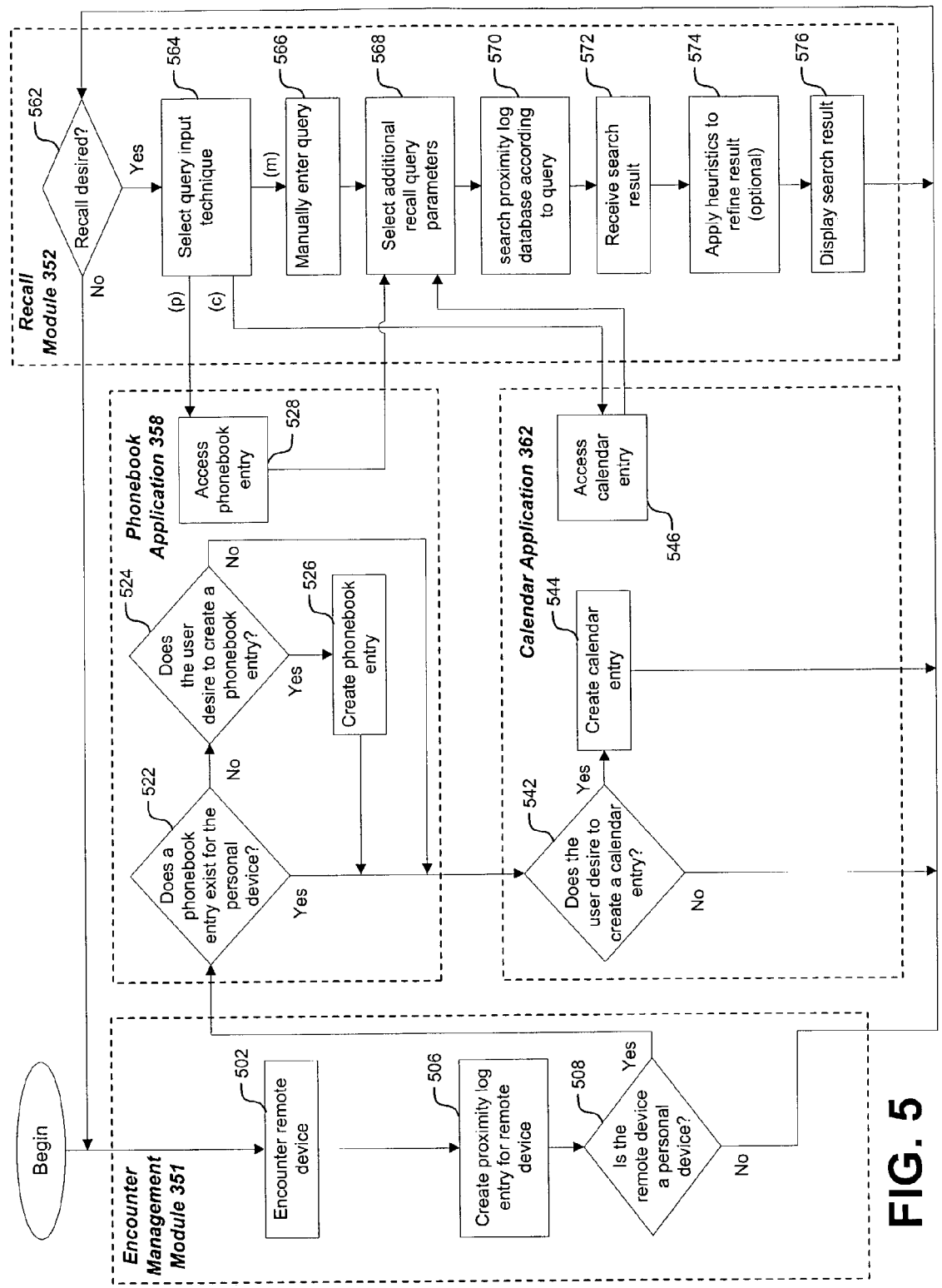
FIG. 5 is a flowchart illustrating an operational sequence according to the present invention.

FIG. 5 is a flowchart illustrating an operational sequence according to the present invention. In particular, FIG. 5 shows a sequence of steps performed by various modules and applications of the architecture shown in FIG. 3. For example, FIG. 5 shows that steps 502-508 are performed by encounter management module 351, steps 522-528 are performed by phonebook application 358, steps 542-546 are performed by calendar application 362, and steps 562-576 are performed by recall module 352. This allocation of steps to the architecture of FIG. 3 is shown as an example. Other allocations are within the scope of the present invention.

The operation shown in FIG. 5 begins with a step 502. In this step, WCD 102 encounters a remote device 104. This step comprises receiving identifying information from the remote device 104. In addition, this step may include obtaining additional information from the remote device 104. For Bluetooth implementations, a performance of step 502 is described in greater detail below with reference to FIG. 6.

In a step 506, encounter management module 351 creates an entry for proximity log database 354. This step comprises placing information in the various fields of a record for proximity log database 354. This information is primarily received from the remote device 104 in step 502. However, some of this information may be internally generated, such as a time value for timestamp field 402.

A step 508 follows step 506. In this step, encounter management module 351 determines whether the encountered remote device 104 is a personal device. If so, then operation proceeds to a step 522. Otherwise, operation proceeds to a step 562.

In step 522, phonebook application 258 determines whether a phonebook entry exists for the encountered remote device 104. If, so the operation proceeds to step 542, which is performed by calendar application 262. Otherwise, phonebook application 258 performs steps 524 and 526. In step 524, phonebook application 524 asks the user of WCD 102 whether it desires to create a phonebook entry for the encountered remote device 104. If so, a phonebook entry for the device is created in step 526.

Step 526 comprises phonebook application 258 creating a record for phonebook entry database 360, this record includes information that was received in step 502. Additionally, step 526 may include asking the user of WCD 102 for supplemental information to be placed in this record. Also, step 526 may include providing the user of WCD 102 with an opportunity to approve and/or correct the information placed in the record before it is stored in phonebook entry database 360. After step 526 is performed, operation proceeds to step 542.

In step 542, calendar application 262 asks the WCD 102 user whether it desires to create a calendar entry. If so, then calendar application 362 performs a step 544. Otherwise operation proceeds to step 562.

In step 544, a record for calendar entry database 364 is created. This record designates an appointment. Accordingly, step 544 comprises asking the user of WCD 102 for information (such as a date, a time, a location, and a duration of the appointment) to be placed in this record. Additionally, step 544 may comprise providing the user of WCD 102 with an opportunity to approve and/or correct the information placed in this record before it is stored in calendar entry database 364. After step 544 is performed, operation proceeds to step 562.

In step 562, recall module 352 determines whether the user of WCD 102 wants to recall a previous encounter. If so, operation proceeds to step 564. In step 564, the user of WCD 102 selects a desired technique for generating a query. These techniques provide a user with different approaches for inputting query parameter(s) that specify desired field values in records of proximity log database 354.

FIG. 5 shows three techniques available to the user. These techniques are phonebook-assisted input (p), calendar-assisted input (c), and manual input (m). However, the scope of the present invention is not limited to these three input techniques.

If the user selects the phonebook-assisted input technique, operation proceeds from step 564 to a step 528. In this step, phonebook application 258 provides access to the entries stored in phonebook entry database 360. The user selects information included in one of these entries (such as a person's name) as a query parameter. After step 528, operation proceeds to a step 568.

If the user selects the calendar-assisted input technique, operation proceeds from step 564 to a step 546. In this step, calendar application 262 provides access to calendar entries stored in calendar entry database 364. The user selects information included in one of these entries (such as a person's name) as a query parameter. After step 546, operation proceeds to step 568.

If the user selects the manual input technique, operation proceeds from step 564 to a step 566. In this step, the user manually enters a query through user interface 210. In particular, step 566 involves the user manually inputting a query parameter. After step 566, operation proceeds to step 568.

As described above, the query parameter(s) that are entered in steps 528, 546, and 566 specify desired field values in records of proximity log database 354. These query parameter(s) may include information that indicates one or more remote devices 104, since each record in proximity log database 354 corresponds to an encounter with a remote device 104. Accordingly, this information may be in the form of a device ID (e.g., a BD_ADDR, a telephone number, or an IP address), a device name, or a device owner's name.

After the user of WCD 102 inputs one or more query parameters, in either of steps 528, 546, and 566, the user may focus the query by selecting one or more focusing parameters in step 568. Focusing parameters place conditions on the desired field values specified by already entered query parameters. Such conditional parameters may place conditions on the retrieval of information in proximity log database 354. For example, the additional parameter may specify the most recent encounter (or the earliest encounter) that matches the query parameters.

In a step 570, the user of WCD 102 submits the query. This query includes the inputted query parameters as well as any focusing parameters that user may have selected. As a result, recall module 252 searches proximity log database 354. This searching involves locating records in proximity log database 354 that match the submitted parameters.

Proximity log database 354 may be searched in various ways during performance of step 570. For instance, this sequence in which records are searched may be selected to increase efficiency, thereby reducing searching times.

For instance, when looking for people that the user of WCD 102 has met, it is probable that the number of discovered identifiers of terminal devices is larger than the number of actual vCard exchanges. We meet more people than we introduce ourselves to. Therefore, when looking for the first time we have met someone, it makes sense to first search all events involving the exchange of information through higher level protocol sessions (such as vCard exchanges), and then the less structured encounters involving only link level connections.

In a step 572, recall module 252 receives a search result from proximity log database 354. This result includes one or more records that match the query submitted in step 570.

An optional step 574 may follow step 572. In this step, heuristics engine 356 of recall module 252 applies heuristics to refine the search result received in step 572. Performance of this step is described in greater detail below. Next, in a step 576, the search result is displayed by user interface 210.

As described above, FIG. 5 illustrates functionality involving remote device encounters, and functionality involving past event recall. These remote device encounters and past event recall operations may be performed concurrently. For example, steps 502 and 506 may be performed in parallel with other steps shown in FIG. 5. Thus, while recall steps (such as steps 564-572) are being performed, steps 502 and 506 may simultaneously create further entries in proximity log database 354 based on further encounters with remote devices. Accordingly, these steps are referred to herein as core encounter steps.

Moreover, although FIG. 5 shows step 562 being performed directly after each of steps 508, 542, and 544, intermediate operations may occur between these steps. For example, further performances of the FIG. 5 steps involving remote device encounters (such as steps 502-508) may be performed after these steps. In fact, the steps of FIG. 5 may be performed in other sequences and may include other steps.

In addition, some of the steps in FIG. 5 involve user interactions. Although user interface software module 350 is not shown in FIG. 5, the modules and applications shown in FIG. 5 may employ user interface software module 350 to facilitate the above-described user interactions.

VI. Bluetooth Remote Device Encounter

Figure 6:
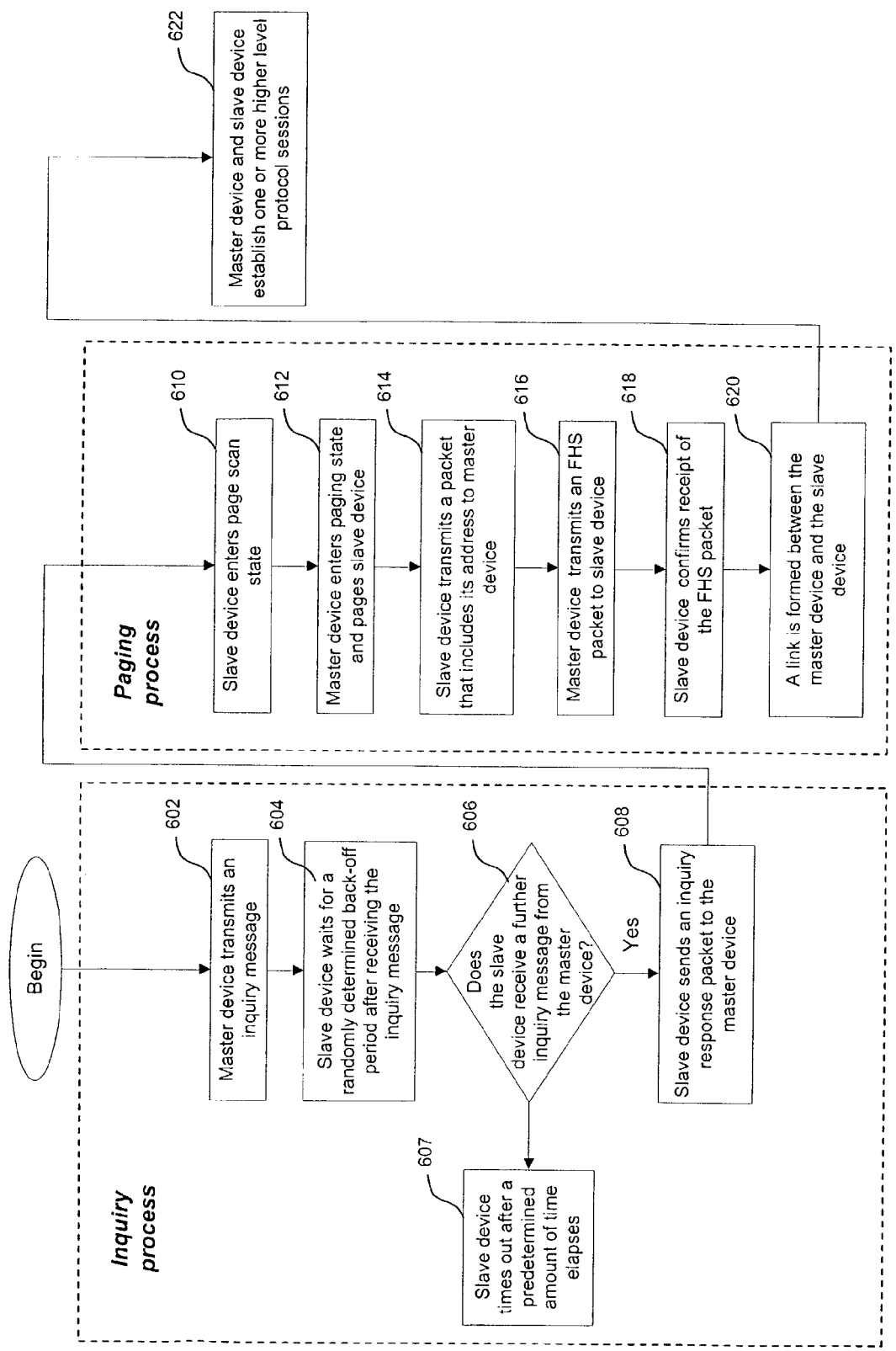
FIG. 6 is a flowchart showing an interaction between two devices in a Bluetooth encounter.

FIG. 6 is a flowchart showing an interaction between two devices in a Bluetooth encounter according to an aspect of the present invention. In particular, FIG. 6 illustrates a performance of step 502 when WCD 102 and a remote device 104 are both Bluetooth devices.

This interaction includes an inquiry process and a paging process. During the inquiry process, a master device learns the identity of other devices in its vicinity. During the paging process, the master device invites a slave device to join a network (also referred to herein as a piconet). In device encounters involving the present invention, WCD 102 may operate as either a slave device or as a master device. Therefore, FIG. 6 is described in the context of master and slave devices.

This interaction begins with a step 602. In this step, a master device searching for other devices in its vicinity transmits an inquiry message, which includes an access code, such as a Bluetooth General Inquiry Access Code (GIAC). Any other Bluetooth device that is listening by means of conducting an inquiry scan, will recognize the inquiry message and respond. With reference to FIG. 6, a response from a single slave device is described.

In a step 604, the slave device waits for a randomly determined back-off period. Next, in a step 606, the slave device determines whether it has received another inquiry message transmitted by the master device. If this occurs, then the slave device replies to the master device with an inquiry response packet in a step 608. The inquiry response is a frequency hop synchronization (FHS) packet containing all of the information required by the inquiring device to address the responding device. This information includes clock value of the sender (i.e., the responding device), the sender's correct device access code, and the class-of-device (CoD) field. The access code includes the lower address part (LAP) and the upper address part (UAP) of the sender's Bluetooth Device Address (BD_ADDR), a unique, 48-bit IEEE address that is electronically engraved into each Bluetooth device.

If an inquiry response packet is not received, then a step 607 may be performed. In this step, the slave device stops waiting for another inquiry message after a predetermined time interval occurs. This is referred to as "timing out."

The paging process begins with a step 610. In this step, the slave device enters a page scan state. While in this state, the slave device waits to receive a message from the master device containing information based on its address.

Next, in a step 612, the master device enters a paging mode and pages the slave device. During this paging process, the master device transmits one or more paging packets to the slave device. These paging packets each include an identification number based on the address of the slave device. Meanwhile, the slave device (which is in page scan mode) responds to the paging packets by transmitting a packet to the master device that includes its address in a step 614.

The master device receives this packet, and in response, transmits a frequency hop synchronization (FHS) packet to the slave device in a step 616. The FHS packet is used to pass information that allows the slave device to synchronize with the frequency hopping sequence of the master device. For example, the FHS packet contains the master device's BD_ADDR (i.e., its unique identifier). Upon receipt of this FHS packet, the slave device transmits a further packet to confirm receipt of the FHS packet in a step 618. Both the master device and the slave device enter into a connection state at this point.

Upon completion of this paging process, a step 620 is performed. In this step, a link is formed between the master device and the slave device. In particular, the slave device synchronizes its clock to the clock of the master device. Thus, the slave device employs the timing and frequency hopping sequence of the master device. Additionally, the master device transmits a packet to verify that a link has been set up. The slave device confirms this link by sending a packet to the master device.

In a step 622, the master and slave devices may optionally establish one or more higher level protocol sessions. These higher level sessions may include an application layer session. For WCD 102 (whether operating as the slave device or the master device), establishment of these higher level protocol sessions may be performed by encounter management module 351. In Bluetooth, such higher level protocol sessions provide for vCard exchanges, and IP communications (such as HTTP get requests).

Also, in Bluetooth, such higher level sessions may include a Service Discovery Protocol (SDP) searching function, where a requesting device (such as WCD 102) learns the services offered by an encountered remote device. With reference to the proximity log database 354 implementation shown in FIG. 4, such information may be used to populate fields, such as device type field 408 and/or supplementary data field 414.

The SDP searching function relies on links being established between the requesting Bluetooth device and the responding Bluetooth device. When a requesting Bluetooth device enters the communications range of the responding Bluetooth device, its Link Controller (LC) layer in its transport protocol group handles the exchange of inquiry and paging packets to establish the initial link with a remote device, as described above. Then, the requesting device's Logical Link Control and Adaptation Protocol (L2CAP) layer in the transport protocol group passes the link status up to the layers in the middleware protocol group. The SDP searching function in the middleware protocol group may then be used to find out about application programs in the responding Bluetooth device that may provide desired services.

VII. Application of Heuristics

As described above with reference to FIG. 5, recall module 252 may apply heuristics in step 574 to refine the search result returned by proximity log database 354 in step 572. These heuristics make use of interdependencies between sequential records in proximity log database 354 and/or information contained in other databases to provide users with useful information.

These heuristics provide reasoning carried out by the Recall application to infer further data that is not directly contained in the database. For example, a heuristic may be used to infer the possible location of a past event. This capability is based on the fact that certain devices are mobile, while other devices are stationary. To infer the location of a past event, embodiments of the present invention assume that impersonal devices (e.g., devices associated with infrastructure objects such as doors and light switches) are stationary. Based on this assumption, once a past encounter is retrieved from proximity log database 354, such as the vCard exchange with Suzie's watch described above with reference to FIG. 1, heuristics engine 356 infers the possible location by finding other events involving stationary objects that occurred within a predetermined time interval (e.g., within 4 minutes) of this encounter.

To facilitate the application of such a heuristic, the name of each stationary object (as stored in device name field 406 of a record in proximity log database 354) preferably contains a description of it's location or a name of the facility. This name or description is then shown to the user, hopefully giving sufficient hints on the location of the encounter with the encounter.

Embodiments of the present invention may also employ heuristics that require interaction between recall module 352 and other modules, such as calendar application 362. Such heuristics are used to provide topical contexts for recalled events. For instance, if an encounter with a particular personal device (such as Suzie's watch) is received in step 572, heuristics engine 356 may provide the time of this encounter, as recorded in timestamp field 402, to calendar application 362. Calendar application 362 then searches calendar entry database 364 for calendar entries around this time (e.g., within one hour).

The application of such heuristics may not always provide accurate results. For instance, these heuristics may suggest an incorrect location or an incorrect topical context. Accordingly, when heuristics are applied, recall module 352 may output a warning to the user of WCD 102 that indicates the heuristics are based on inferences and may not be correct. This warning may accompany the outputting of search results in step 576 of FIG. 5.

VIII. Example Recall Scenario

An example of an operation of WCD 102 according to the present invention is now described with reference to the steps shown in FIG. 5, as well as the exemplary proximity log database 354 entries shown in FIG. 4. In this example, a user of WCD 102 plans to write a memo on the feasibility of interstellar travel. The user seems to recall that Suzie mentioned some recent developments on this topic when they last met. In particular, Suzie introduced the user to her colleague, who is an expert on interstellar travel. Unfortunately, the name of the colleague escapes the user's memory.

To recall details regarding this past meeting with Suzie, the user (through interaction with user interface 210) indicates that he desires to perform recall operations, as shown in step 562. Next, in step 564, the user selects phonebook-assisted input and operation proceeds to step 528, where the user (through interaction with phonebook application 358) finds the phonebook entry for "Suzie", and selects Suzie as a query parameter. Next, through performance of step 568, the user selects a focusing query parameter from a menu of focusing parameters displayed by user interface 210. In this case, the user selects "Last encounter with" as a focusing parameter.

A query containing these parameters is submitted to proximity log database 354 in step 570. In step 572, a search result is returned and outputted by user interface 210, indicating "You last met Suzie on Jan. 19, 2004 at 3:48PM."

Next, heuristics are applied to this search result through performance of step 574. In this example, heuristics are applied to suggest a possible location of this recalled encounter with Suzie. In addition, heuristics are applied to suggest a topical context for this recalled encounter. Thus, recall module 352 searches for entries involving stationary objects in proximity log database 354 that occurred within a predetermined time interval of the recalled encounter. Recall module 352 finds a record in proximity log database 354 involving a device named "Door C5 in Parliament House."

In addition, recall module 352 requests calendar application 362 to search calendar entry database 364 for the calendar entry that is closest in time to the recalled encounter. Calendar application 362 indicates a calendar entry entitled "Blue Sky meeting." In addition, a hyperlink to this calendar entry is output by user interface 210.

As a result of these heuristics, recall module 352 outputs "Possible location: Parliament House. Possible topic: Blue Sky meeting." To obtain the name of Suzie's colleague, the user selects the calendar entry's hyperlink and looks at a list of Blue Sky meeting attendees. This list of attendees includes the name Bill Board (whose name triggers the user's memory as being the interstellar travel expert). As a result of the previous encounter with Bill Board's communicator at time $T_D$. Bill's contact information is stored in phonebook entry database 360. Therefore, the user sends Bill a brief message reminding him of the encounter at the Parliament House and asking for latest pointers on interstellar travel.

IX. Conclusion

While various embodiments of the present invention have been described above, it should be understood that they have been presented by way of example only, and not limitation. For instance, the present invention is not limited to Bluetooth. Furthermore, the present invention can be applied to previous and future developed Bluetooth standards, as well as variations from such Bluetooth standards.

Moreover, although the processes of FIGS. 5, and 6 are described with reference to the elements of FIG. 3, these processes may be applied to other implementations and architectures. For example, these processes may be performed through a distributed architecture, where databases (such as proximity log database 354), and processing functionality, (such as encounter management module 351 and recall module 352) are located in one or more remote servers, such as remote server 108. Together, WCD 102 and the remote server(s) cooperatively perform the processing and data storage techniques of the present invention. The allocation of such features to remote server(s) advantageously reduces the processing and information storage requirements for WCD 102.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A wireless communications device for retrieving information related to past events, comprising:
  a processor;
  an encounter management module including a heuristic engine configured to receive in communication sessions from encountered remote devices identifying information of the encountered remote devices and infer data related to past events from the information;
  a proximity log database configured to receive and store automatically entries of the identifying information of prior communication sessions received by the encounter management module for past encountered events between the wireless communication device and the encountered remote device, wherein said heuristics engine is configured to (1) search records in said proximity log database that correspond to events occurring within a predetermined time interval of the past remote device encounter identified by the result, (2) interact with a calendar application configured to determine a topical context for the past remote device encounters identified by the result, and (3) infer data from entries of past events in the proximity log data base using deductive reasoning and identifies patterns, relationships, and/or interdependencies between entries in the proximity log database;

a personal information management application configured to provide one or more parameters for a query that is related to a past event of encountering devices; and a recall module configured to search said proximity log database of events according to the query, and to receive a result from said proximity log database as a response to the query, wherein the result identifies information in the form of details associated with a past remote device encounter event refined by the inferences made by the heuristics engine.

2. The wireless communications device of claim 1, wherein said personal information management application is a phonebook application.

3. The wireless communications device of claim 1, wherein said personal information management application is a calendar application.

4. The wireless communications device of claim 1, wherein the heuristics engine determines the topical context by indicating a topic of an appointment scheduled within a predetermined time interval of the past remote device encounter identified by the result.

5. The wireless communications device of claim 1, wherein said encounter management module is configured to receive a unique remote device identifier through a link level connection and additional information through a higher layer protocol session.

6. The wireless communications device of claim 5, wherein the link level connection is a Bluetooth connection.

7. The wireless communications device of claim 5, wherein the higher protocol layer session is an application level session.

8. The wireless communications device of claim 1, wherein the additional information includes a vCard.

9. The wireless communications device of claim 1, wherein said encounter management module searches information related to encounters involving higher layer protocol sessions before searching information related to encounters involving only link level connections.

10. The wireless communications device of claim 1, wherein the identifying information received from the encountered remote devices includes a device identifier for each encountered remote device.

11. The wireless communications device of claim 10, wherein the device identifier for each encountered remote device is received across a short-range wireless communications link with the corresponding encountered remote device.

12. A method of retrieving information related to past events from a wireless communications device, comprising:

receiving from encountered remote devices including a heuristics engine configured to receive in communication sessions from encountered remote devices identifying information of past events of the encountered remote devices and infer data of event details from the information and supplementary data, wherein said inferring step comprises (1) searching records in the proximity log database that correspond to events occurring within a predetermined time interval of the past remote device encounter identified by the result, and (2) determining a topical context of the past remote device encounter by indicating a tonic of an appointment within a predetermined time interval of the past remote device encounter identified by the result;

receiving and storing automatically the received identifying information in a proximity log database configured to store automatically entries of the identifying information of prior communication sessions received by an encounter management module for past encountered events between the wireless communication device and the encountered remote device, wherein the heuristics engine infers data of event details from entries in the proximity log data base using deductive reasoning and identifies patterns, relationships, and/or interdependencies between entries in the proximity log database;

accessing an entry of past events of encountering devices stored in the proximity database by a personal information management application; and generating a query that is related to a past event from one or more query parameters of encountering devices provided by the personal information management application;

searching the proximity log database according to the query; and obtaining a result from the proximity log database as a response to the query, wherein the result identifies information of details associated with a past remote device encounter refined by inferences made by the heuristics engine.

13. The method of claim 12, wherein said receiving step comprises receiving a unique remote device identifier through a link level connection and additional information through a higher layer protocol session.

14. The method of claim 13, wherein the link level connection is a Bluetooth connection.

15. The method of claim 13, wherein the higher protocol layer session is an application level session.

16. The method of claim 13, wherein the additional information includes a vCard.

17. The method of claim 12, wherein said searching step comprises searching information related to encounters involving higher layer protocol sessions before searching information related to encounters involving only link level connections.

18. The method of claim 12, wherein the personal information management application is a phonebook application.

19. The method of claim 12, wherein the personal information management application is a calendar application.

20. The method of claim 12, wherein receiving the identifying information from the encountered remote devices includes receiving a device identifier for each encountered remote device.

21. The method of claim 20, wherein the device identifier for each encountered remote device is received across a short-range wireless communications link with the corresponding encountered remote device.

22. The method of claim 12, wherein said storing step comprises storing the received identifying information in a remote server.

23. A computer program product comprising a computer useable medium having computer program logic recorded thereon for enabling a processor in a wireless communications device to retrieve information related to past events, the computer program logic comprising:

program code for enabling the processor to receive from encountered remote devices identifying information of the encountered remote devices, and a heuristics engine configured to receive in communication sessions from the encountered remote devices identifying information of past events of the encountered remote devices and infer data of event details from the information;

program code for enabling the processor to store automatically in a proximity database entries of the identifying information of prior communication sessions received by an encounter management module for past encountered events between the wireless communication device and the encountered remote device, wherein the heuristics engine (1) searches records in said proximity log database that correspond to events occurring within a predetermined time interval of the past remote device encounter identified by the result, (2) interacts with a calendar application configured to determine a topical context for the past remote device encounters identified by the result, and (3) infers data from entries in the proximity log data base using deductive reasoning and identifies patterns, relationships, and/or interdependencies between entries in the proximity log database;

program code for enabling the processor to access an entry of past events of encountering devices stored in the proximity log data base by a personal information management application;

program code for enabling the processor to generate a query that is related to a past event from one or more query parameters of encountering devices provided by a personal information management application;

program code for enabling the processor to search the proximity log database according to the query; and program code for enabling the processor to receive a result from the proximity log database as a response to the query, wherein the result identifies information of details associated with a past remote device encounter, refined by inferences made by the heuristics engine.

24. The computer program product of claim 23, wherein the identifying information received from the encountered remote devices includes a device identifier for each encountered remote device.

25. The computer program product of claim 24, wherein the device identifier for each encountered remote device is received across a short-range wireless communications link with the corresponding encountered remote device.

* * * * *